(12) United States Patent
Donahue et al.

(10) Patent No.: US 12,416,343 B2
(45) Date of Patent: Sep. 16, 2025

(54) SHOCK ABSORBER AND MANUFACTURING METHOD OF SHOCK ABSORBER

(71) Applicant: Hitachi Astemo, Ltd., Ibaraki (JP)

(72) Inventors: Joel Donahue, Novi, MI (US); Jordan Truitt, Farmington Hills, MI (US); Takeru Yokota, Hitachinaka (JP); Koji Minamino, Hitachinaka (JP)

(73) Assignee: Hitachi Astemo, Ltd., Ibaraki (JP)

( * ) Notice: Subject to any disclaimer, the term of this patent is extended or adjusted under 35 U.S.C. 154(b) by 443 days.

(21) Appl. No.: 17/954,390

(22) Filed: Sep. 28, 2022

(65) Prior Publication Data

US 2024/0102528 A1  Mar. 28, 2024

(51) Int. Cl.
*F16F 9/18* (2006.01)
*F16F 9/32* (2006.01)
(Continued)

(52) U.S. Cl.
CPC ............ *F16F 9/185* (2013.01); *F16F 9/3214* (2013.01); *F16F 9/3271* (2013.01); *F16F 9/348* (2013.01); *F16F 9/368* (2013.01); *B60G 13/08* (2013.01); *B60G 2202/24* (2013.01); *B60G 2206/41* (2013.01); *B60G 2800/162* (2013.01); *F16F 2222/12* (2013.01); *F16F 2226/04* (2013.01);
(Continued)

(58) Field of Classification Search
CPC ........ F16F 9/185; F16F 9/3214; F16F 9/3271; F16F 9/348; F16F 9/368; F16F 2222/12; F16F 2226/04; F16F 2232/08; B60G 13/08; B60G 2202/24; B60G 2206/41; B60G 2800/162

USPC ......... 188/282.1, 282.2, 282.5, 282.6, 282.8, 188/322.15
See application file for complete search history.

(56) References Cited

U.S. PATENT DOCUMENTS 4,895,229 A * 1/1990 Kato ..................... F16F 9/3484
188/280
4,964,493 A 10/1990 Yamaura et al.
(Continued)

FOREIGN PATENT DOCUMENTS

JP 01-149037 U 10/1989
JP 02-113142 A 4/1990
(Continued)

OTHER PUBLICATIONS

International Search Report received in corresponding International Application No. PCT/JP2023/033428 dated Dec. 5, 2023.
(Continued)

*Primary Examiner* — Christopher P Schwartz
(74) *Attorney, Agent, or Firm* — Mattingly & Malur, PC

(57) ABSTRACT

In this shock absorber, a piston includes a first piston body, a second piston body, and a piston band. The first piston body includes a first passage, a second passage, a first seat, and a second seat. The first seat communicates with the first passage and on which a first damping valve is placed. A second damping valve is placed on the second seat. The second piston body includes a third passage, a fourth passage, a third seat, and a fourth seat. The third seat communicates with the fourth passage and on which a third damping valve is placed. A fourth damping valve is placed on the fourth seat.

4 Claims, 5 Drawing Sheets

(51) Int. Cl.
    *F16F 9/348* (2006.01)
    *F16F 9/36* (2006.01)
    *B60G 13/08* (2006.01)

(52) U.S. Cl.
    CPC ....... *F16F 2232/08* (2013.01); *F16F 2234/02* (2013.01)

(56) References Cited

U.S. PATENT DOCUMENTS

| | | | | |
|---|---|---|---|---|
| 5,042,624 | A * | 8/1991 | Furuya | F16F 9/348 188/322.22 |
| 8,800,729 | B2 * | 8/2014 | Yabe | F16F 9/465 188/266.6 |
| 9,182,005 | B2 * | 11/2015 | Goldasz | F16F 9/3484 |
| 9,777,790 | B2 * | 10/2017 | Mizuno | F16F 9/3485 |
| 2009/0294232 | A1 | 12/2009 | Masahiro | |
| 2013/0037361 | A1 | 2/2013 | Park et al. | |
| 2014/0150897 | A1 | 6/2014 | Ashiba | |
| 2016/0258504 | A1 | 9/2016 | Kazuyuki et al. | |
| 2024/0102530 | A1 * | 3/2024 | Sankaran | F16F 9/22 |
| 2024/0309933 | A1 * | 9/2024 | Truitt | F16F 9/49 |

FOREIGN PATENT DOCUMENTS

| | | |
|---|---|---|
| JP | 2009-287731 A | 12/2009 |
| JP | 2010-107003 A | 5/2010 |
| JP | 2014-129865 A | 7/2014 |
| JP | 2015-086966 A | 5/2015 |
| JP | 2019-163768 A | 9/2019 |
| JP | 2021-181818 A | 11/2021 |

OTHER PUBLICATIONS

Written Opinion received in corresponding International Application No. PCT/JP2023/033428 dated Dec. 5, 2023.

* cited by examiner

SHOCK ABSORBER AND MANUFACTURING METHOD OF SHOCK ABSORBER

BACKGROUND OF THE INVENTION

Field of the Invention

The present invention relates to a shock absorber and a manufacturing method of a shock absorber.

Description of Related Art

There are shock absorbers in which a piston is constituted by a plurality of piston bodies (see, for example, Japanese Unexamined Patent Application, First Publication No. 2010-107003, Japanese Unexamined Patent Application, First Publication No. 2014-129865, Japanese Unexamined Patent Application, First Publication No. H2-113142, and the specification of United States Patent Application, Publication No. 2013/0037361).

There is also a shock absorber that includes a valve and a valve that opens in a region in which a piston speed is higher than that of the above-described valve (see, for example, the specification of United States Patent Application, Publication No. 2013/0037361, and Japanese Unexamined Utility Model Application, First Publication No. H1-149037).

Incidentally, in shock absorbers, there has been a demand to suppress a decrease in productivity.

Accordingly, an objective of the present invention is to provide a shock absorber and a manufacturing method of a shock absorber that can suppress a decrease in productivity.

SUMMARY OF THE INVENTION

In order to achieve the above-described objective, one aspect of a shock absorber of the present invention includes a cylinder in which a working fluid is sealed, a piston fitted in the cylinder to be slidable and partitioning an inside of the cylinder into two chambers, and a piston rod connected to the piston and extending to an outside of the cylinder, in which the piston includes a first piston body having, a first passage and a second passage configured to allow the working fluid to flow between one chamber and the other chamber in the cylinder due to movement of the piston, a first seat communicating with the first passage and on which a first damping valve which opens at a low piston speed is placed, and a second seat having a larger diameter than the first seat, provided on the chamber side, and on which a second damping valve which opens after the first damping valve opens is placed, and a second piston body having a third passage and a fourth passage configured to allow the working fluid to flow between one chamber and the other chamber in the cylinder due to movement of the piston, a third seat communicating with the fourth passage and on which a third damping valve which opens at a low piston speed is placed, and a fourth seat having a larger diameter than the third seat, provided on the chamber side, and on which a fourth damping valve which opens after the third damping valve opens is placed, and in which the first piston body and the second piston body are connected so that the first passage communicates with the third passage and the second passage communicates with the fourth passage.

One aspect of a manufacturing method of a shock absorber of the present invention is a manufacturing method of a shock absorber including a cylinder in which a working fluid is sealed, a piston fitted in the cylinder to be slidable and partitioning an inside of the cylinder into two chambers, and a piston rod connected to the piston and extending to an outside of the cylinder, in which the piston includes a first piston body having a first passage and a second passage configured to allow the working fluid to flow between one chamber and the other chamber in the cylinder due to movement of the piston, a first seat communicating with the first passage and on which a first damping valve which opens at a low piston speed is placed, and a second seat having a larger diameter than the first seat, provided on the chamber side, and on which a second damping valve which opens after the first damping valve opens is placed, a second piston body having a third passage and a fourth passage configured to allow the working fluid to flow between one chamber and the other chamber in the cylinder due to movement of the piston, a third seat communicating with the fourth passage and on which a third damping valve which opens at a low piston speed is placed, and a fourth seat having a larger diameter than the third seat, provided on the chamber side, and on which a fourth damping valve which opens after the third damping valve opens is placed, and a piston band provided in the first piston body and the second piston body, and the manufacturing method of a shock absorber includes a first step of connecting one surface of the first piston body and one surface of the second piston body so that the first passage communicates with the third passage and the second passage communicates with the fourth passage, a second step of processing an end portion of the first passage opposite to the third passage, an end portion of the third passage opposite to the first passage, an end portion of the second passage opposite to the fourth passage, an end portion of the fourth passage opposite to the second passage, and a groove to which the piston band is attached, and a third step of attaching the piston band to the groove.

According to the above-described aspects of the present invention, a decrease in productivity can be suppressed.

DETAILED DESCRIPTION OF THE INVENTION

Figure 1:
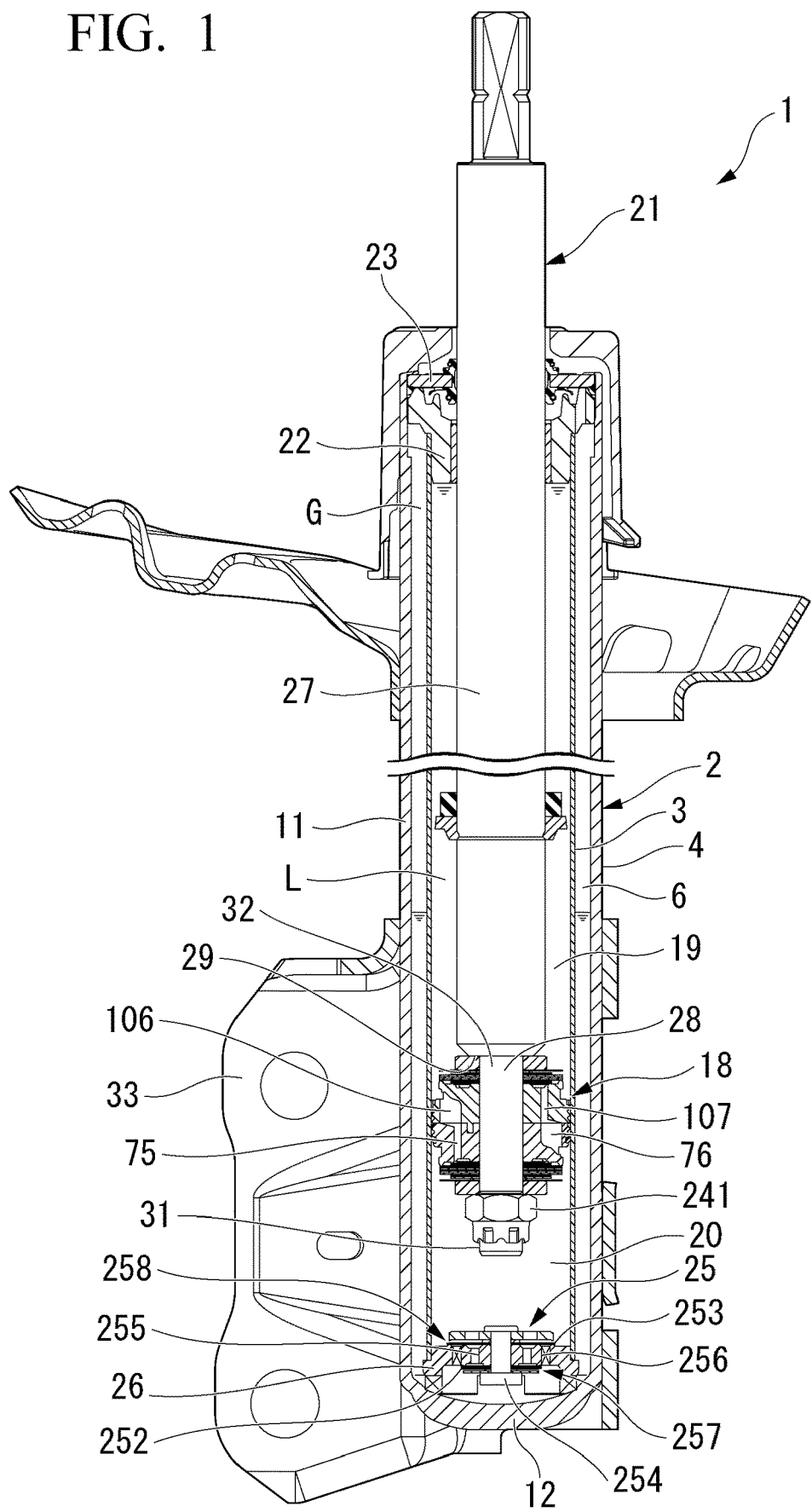
FIG. 1 is a cross-sectional view showing a shock absorber of one embodiment according to the present invention.

A shock absorber of one embodiment according to the present invention will be described on the basis of the drawings. Further, in the following description, for convenience of explanation, an upper side in the drawings will be referred to as "upper" and a lower side in the drawings will be referred to as "lower."

As shown in FIG. 1, a shock absorber 1 of the embodiment is a dual-tube type hydraulic shock absorber. The shock absorber 1 is used in suspension devices of vehicles, specifically automobiles. The shock absorber 1 includes a cylinder 2. The cylinder 2 includes an inner tube 3 and an outer tube 4. The inner tube 3 has a cylindrical shape. The outer tube 4 has a bottomed cylindrical shape. An inner diameter of the outer tube 4 is larger than an outer diameter of the inner tube 3. The inner tube 3 is disposed on a radial inner side of the outer tube 4. A central axis of the inner tube 3 and a central axis of the outer tube 4 coincide with each other. A reservoir chamber 6 is provided between the inner tube 3 and the outer tube 4.

The outer tube 4 includes a barrel part 11 and a bottom part 12. The barrel part 11 and the bottom part 12 are formed seamlessly and integrally. The barrel part 11 has a cylindrical shape. The bottom part 12 closes a lower portion of the barrel part 11.

The shock absorber 1 includes a piston 18. The piston 18 is inserted inside the inner tube 3 of the cylinder 2. The piston 18 is slidably fitted in the inner tube 3 of the cylinder 2. The piston 18 partitions the inside of the inner tube 3 into two chambers, a first chamber 19 on one side and a second chamber 20 on the other side. The first chamber 19 is on a side opposite to the bottom part 12 with respect to the piston 18 in an axial direction of the cylinder 2. The second chamber 20 is on a side of the bottom part 12 with respect to the piston 18 in the axial direction of the cylinder 2. In the cylinder 2, an oil fluid L is sealed as a working fluid in the first chamber 19 and the second chamber 20 in the inner tube 3. In the cylinder 2, the oil fluid L and a gas G are sealed as working fluids in the reservoir chamber 6 between the inner tube 3 and outer tube 4.

The shock absorber 1 includes a piston rod 21. One end side of the piston rod 21 in the axial direction is disposed inside the inner tube 3 of the cylinder 2. This one end side of the piston rod 21 is connected to the piston 18. The other side of the piston rod 21 in the axial direction extends from the cylinder 2 to the outside of the cylinder 2.

The piston 18 is fixed to the piston rod 21. Therefore, the piston 18 and the piston rod 21 move together. In the shock absorber 1, a stroke in which the piston rod 21 moves in a direction to increase a protrusion amount from the cylinder 2 is an extension stroke in which the entire length increases. In the shock absorber 1, a stroke in which the piston rod 21 moves in a direction to decrease the protrusion amount from the cylinder 2 is a compression stroke in which the entire length decreases. In the shock absorber 1, the piston 18 moves to the first chamber 19 side during the extension stroke. In the shock absorber 1, the piston 18 moves to the second chamber 20 side during the compression stroke.

A rod guide 22 is fitted to an upper end opening side of the inner tube 3 and an upper end opening side of the outer tube 4. A seal member 23 is fitted on an upper side of the rod guide 22 in the outer tube 4. Both the rod guide 22 and the seal member 23 are annular. The piston rod 21 is inserted through a radial inner side of the rod guide 22 and the seal member 23. The piston rod 21 slides in the axial direction of the rod guide 22 and the seal member 23. The piston rod 21 extends from the inside of the cylinder 2 to the outside of the cylinder 2 from the seal member 23.

The rod guide 22 restricts movement of the piston rod 21 in the radial direction with respect to the inner tube 3 and the outer tube 4 of the cylinder 2. The piston rod 21 is fitted in the rod guide 22 and the piston 18 is fitted in the inner tube 3. Thereby, a central axis of the piston rod 21 and the central axis of the inner tube 3 coincide with each other. The rod guide 22 supports the piston rod 21 to be movable in the axial direction of the piston rod 21. The seal member 23 has an outer circumferential portion in close contact with the outer tube 4. The seal member 23 has an inner circumferential portion in close contact with an outer circumferential portion of the piston rod 21. The piston rod 21 moves in the axial direction of the seal member 23 with respect to the seal member 23. The seal member 23 suppresses the oil fluid L in the inner tube 3 and the high-pressure gas G and the oil fluid L in the reservoir chamber 6 leaking out to the outside.

An outer circumferential portion of the rod guide 22 has a larger diameter at an upper portion than at a lower portion. The rod guide 22 is fitted to an inner circumferential portion of an upper end of the inner tube 3 at the lower portion with the small diameter. The rod guide 22 is fitted to an upper inner circumferential portion of the outer tube 4 at the upper portion having a large diameter. A base member 26 of a base valve 25 is installed on the bottom part 12 of the outer tube 4. The base member 26 is positioned in the radial direction with respect to the outer tube 4. An outer circumferential portion of the base member 26 has a smaller diameter at an upper portion than at a lower portion. The base member 26 is fitted to an inner circumferential portion of a lower end of the inner tube 3 at the upper portion with the small diameter. Thereby, the central axis of the inner tube 3 and the central axis of the outer tube 4 coincide with each other. The base member 26 partitions the second chamber 20 and the reservoir chamber 6.

An upper end portion of the outer tube 4 is swaged inward in the radial direction of the outer tube 4. The seal member 23 is fixed to the cylinder 2 by being sandwiched between the swaged portion and the rod guide 22.

The piston rod 21 includes a main shaft part 27 and a mounting shaft part 28. Both the main shaft part 27 and the mounting shaft part 28 have a rod shape.

The mounting shaft part 28 has an outer diameter smaller than an outer diameter of the main shaft part 27. The mounting shaft part 28 is disposed inside the cylinder 2. The piston 18 is attached to the mounting shaft part 28. The main shaft part 27 includes a shaft step part 29. The shaft step part 29 is provided at an end portion of the main shaft part 27 on the mounting shaft part 28 side in the axial direction. The shaft step part 29 extends in a direction perpendicular to the central axis of the piston rod 21. The mounting shaft part 28 includes a screw shaft part 31 formed at an end portion of the mounting shaft part 28 on a side opposite to the main shaft part 27 in the axial direction. The screw shaft part 31 has a male screw formed on an outer circumferential portion. A portion of the mounting shaft part 28 formed between the main shaft part 27 and the screw shaft part 31 in the axial direction of the mounting shaft part 28 is a fitting shaft part 32. An outer circumferential surface of the fitting shaft part 32 is a cylindrical surface. The piston 18 is fitted to the fitting shaft part 32.

In the shock absorber 1, a portion of the piston rod 21 protruding from the cylinder 2 is disposed at an upper portion to be connected to a vehicle body of a vehicle. At the same time, in the shock absorber 1, a mounting bracket 33 fixed to the barrel part 11 of the outer tube 4 is disposed at a lower portion to be connected to a wheel side of the vehicle. The shock absorber 1 may be of a single-tube type instead of a dual-tube type. A single-tube type has a structure in which the outer tube 4 and the base valve 25 are eliminated from the shock absorber 1, a bottomed cylindrical cylinder is provided instead of the inner tube 3, and a free piston is provided between the bottom part of the cylinder and the piston 18. Then, a gas is sealed between the bottom part of the cylinder and the free piston. When such a single-tube type shock absorber is used, it is also possible to connect the cylinder side to the vehicle body and the piston rod 21 to the wheel side.

Figure 2:
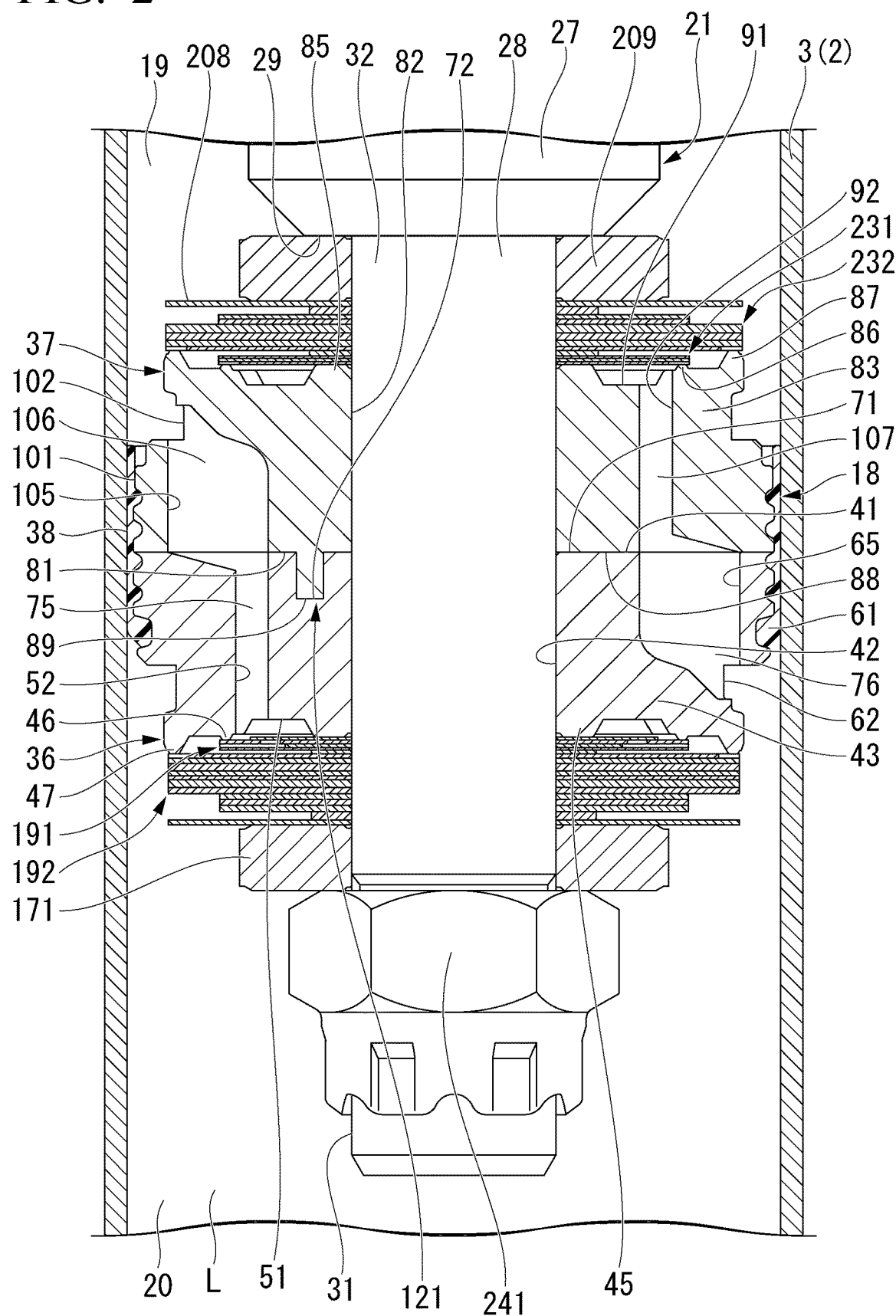
FIG. 2 is a cross-sectional view of a main part showing the shock absorber of one embodiment according to the present invention.

As shown in FIG. 2, the piston 18 includes a first piston body 36, a second piston body 37, and a piston band 38. Both the first piston body 36 and the second piston body 37 are integrally formed product made of a metal. Both the first piston body 36 and the second piston body 37 are annular. The first piston body 36 and the second piston body 37 of the piston 18 are connected to the mounting shaft part 28 of the piston rod 21. At that time, the first piston body 36 is disposed on a side opposite to the main shaft part 27 with respect to the second piston body 37 in the axial direction of the piston rod 21. Also, at that time, the second piston body 37 is disposed between the first piston body 36 and the shaft step part 29.

The first piston body 36 has a joint surface 41 formed on the second piston body 37 side in the axial direction. The joint surface 41 has a planar shape that extends perpendicular to a central axis of the first piston body 36.

A through hole 42 is formed at a center of the first piston body 36 in the radial direction. The through hole 42 penetrates the first piston body 36 in the axial direction of the first piston body 36. The mounting shaft part 28 of the piston rod 21 is fitted into the through hole 42 of the first piston body 36.

The first piston body 36 includes a main body part 43, an inner seat 45, a first seat 46, and a second seat 47.

The main body part 43 has an annular shape. An inner side of the main body part 43 in the radial direction is a part of the through hole 42.

The inner seat 45 has an annular shape. The inner seat 45 protrudes from the main body part 43 to a side of the first piston body 36 opposite to the joint surface 41 in the axial direction. An inner side of the inner seat 45 in the radial direction is a part of the through hole 42.

The first seat 46 has an annular shape. The first seat 46 protrudes from the main body part 43 to a side of the first piston body 36 opposite to the joint surface 41 in the axial direction. The first seat 46 has a larger diameter than the inner seat 45. The first seat 46 is provided on a side outward from the inner seat 45 in the radial direction of the first piston body 36 to surround the inner seat 45. A distal end surface of the first seat 46 is provided on a side opposite to the joint surface 41 with respect to a distal end surface of the inner seat 45 in the axial direction of the first piston body 36.

The first piston body 36 has a passage groove 51 formed between the inner seat 45 and the first seat 46 in the radial direction of the first piston body 36. The passage groove 51 has an annular shape extending in a circumferential direction of the first piston body 36.

A passage hole 52 is formed in the main body part 43 of the first piston body 36 between the inner seat 45 and the first seat 46 in the radial direction of the first piston body 36. The passage hole 52 is disposed on the first seat 46 side with respect to the inner seat 45 in the radial direction of the first piston body 36. The passage hole 52 has one end that opens to the joint surface 41 and the other end that opens to the passage groove 51. A plurality of passage holes 52 having the same shape are provided in the first piston body 36 at regular intervals in the circumferential direction of the first piston body 36.

The second seat 47 has an annular shape. The second seat 47 protrudes from the main body part 43 to a side of the first piston body 36 opposite to the joint surface 41 in the axial direction. The second seat 47 has a larger diameter than the first seat 46. The second seat 47 is provided on a side outward from the first seat 46 in the radial direction of the first piston body 36 to surround the first seat 46. The second seat 47 is provided on a side opposite to the joint surface 41 with respect to the first seat 46 in the axial direction of the first piston body 36.

The first piston body 36 has an outer circumferential surface 61 formed at an outer end in the radial direction. The outer circumferential surface 61 has a cylindrical surface shape centered on the central axis of the first piston body 36. The outer circumferential surface 61 is provided on the main body part 43.

The first piston body 36 has an opening groove part 62 on an outer circumferential portion on a radially outer side thereof. The opening groove part 62 is recessed inward in the radial direction of the first piston body 36 from the outer circumferential surface 61. The opening groove part 62 has an annular shape centered on the central axis of the first piston body 36. The opening groove part 62 is provided between a center of the first piston body 36 in the axial direction and the second seat 47. A bottom surface of the opening groove part 62 overlaps the second seat 47 in position in the radial direction of the first piston body 36.

A passage hole 65 is formed in the main body part 43 of the first piston body 36. The passage hole 65 has one end that opens to the joint surface 41 and the other end that opens to the opening groove part 62. A plurality of passage holes 65 having the same shape are provided in the first piston body 36 at regular intervals in the circumferential direction of the first piston body 36. In the first piston body 36, the passage holes 52 and the passage holes 65 are alternately provided at equal pitches in the circumferential direction of the first piston body 36. Therefore, the first piston body 36 includes the passage holes 52 and the passage holes 65 that are equal in number.

The main body part 43 has a recessed part 72 that is recessed from the joint surface 41 to the inner seat 45 side in the axial direction of the first piston body 36.

In the first piston body 36, passages in the plurality of passage holes 52 and a passage in the passage groove 51 form a first passage 75. The first passage 75 includes a space portion between the inner seat 45 and the first seat 46. Therefore, the first seat 46 communicates with the first passage 75. The first passage 75 includes a space portion between the first seat 46 and the second seat 47. Therefore, the second seat 47 also communicates with the first passage 75.

In the first piston body 36, passages in the plurality of passage holes 65 and a passage in the opening groove part 62 form a second passage 76.

The second piston body 37 has a joint surface 81 formed on the first piston body 36 side in the axial direction. The joint surface 81 has a planar shape that extends perpendicular to a central axis of the second piston body 37.

A through hole 82 is formed at a center of the second piston body 37 in the radial direction. The through hole 82 penetrates the second piston body 37 in the axial direction of the second piston body 37. The mounting shaft part 28 of the piston rod 21 is fitted into the through hole 82 of the second piston body 37.

The second piston body 37 includes a main body part 83, an inner seat 85, a third seat 86, a fourth seat 87, and a protruding part 89.

The main body part 83 has an annular shape. An inner side of the main body part 83 in the radial direction is a part of the through hole 82.

The inner seat 85 has an annular shape. The inner seat 85 protrudes from the main body part 83 to a side of the second piston body 37 opposite to the joint surface 81 in the axial direction. An inner side of the inner seat 85 in the radial direction is a part of the through hole 82.

The third seat 86 has an annular shape. The third seat 86 protrudes from the main body part 83 to a side of the second piston body 37 opposite to the joint surface 81 in the axial direction. The third seat 86 has a larger diameter than the inner seat 85. The third seat 86 is provided on a side outward from the inner seat 85 in the radial direction of the second piston body 37 to surround the inner seat 85. A distal end surface of the third seat 86 is provided on a side opposite to the joint surface 81 with respect to a distal end surface of the inner seat 85 in the axial direction of the second piston body 37.

The second piston body 37 has a passage groove 91 formed between the inner seat 85 and the third seat 86 in the radial direction of the second piston body 37. The passage groove 91 has an annular shape extending in the circumferential direction of the second piston body 37.

A passage hole 92 is formed in the main body part 83 of the second piston body 37 between the inner seat 85 and the third seat 86 in the radial direction of the second piston body 37. The passage hole 92 is disposed on the third seat 86 side with respect to the inner seat 85 in the radial direction of the second piston body 37. The passage hole 92 has one end that opens to the joint surface 81 and the other end that opens to the passage groove 91. A plurality of passage holes 92 having the same shape are provided in the second piston body 37 at regular intervals in the circumferential direction of the second piston body 37. The number of passage holes 92 is the same as the number of passage holes 52 of the first piston body 36.

The fourth seat 87 has an annular shape. The fourth seat 87 protrudes from the main body part 83 to a side of the second piston body 37 opposite to the joint surface 81 in the axial direction. The fourth seat 87 has a larger diameter than the third seat 86. The fourth seat 87 is provided on a side outward from the third seat 86 in the radial direction of the second piston body 37 to surround the third seat 86. The fourth seat 87 is provided on a side opposite to the joint surface 81 with respect to the third seat 86 in the axial direction of the second piston body 37.

The second piston body 37 has an outer circumferential surface 101 formed at an outer end in the radial direction. The outer circumferential surface 101 has a cylindrical surface shape centered on the central axis of the second piston body 37. The outer circumferential surface 101 is provided on the main body part 83. An outer diameter of the outer circumferential surface 101, that is, an outer diameter of the second piston body 37 is equivalent to an outer diameter of the outer circumferential surface 61 of the first piston body 36, that is, an outer diameter of the first piston body 36.

The second piston body 37 has an opening groove part 102 on an outer circumferential portion on a radially outer side thereof. The opening groove part 102 is recessed inward in the radial direction of the second piston body 37 from the outer circumferential surface 101. The opening groove part 102 has an annular shape centered on the central axis of the second piston body 37. The opening groove part 102 is provided between a center of the second piston body 37 in the axial direction and the fourth seat 87. A bottom surface of the opening groove part 102 overlaps the fourth seat 87 in position in the radial direction of the second piston body 37.

A passage hole 105 is formed in the main body part 83 of the second piston body 37. The passage hole 105 has one end that opens to the joint surface 81 and the other end that opens to the opening groove part 102. A plurality of passage holes 105 having the same shape are provided in the second piston body 37 at regular intervals in the circumferential direction of the second piston body 37. In the second piston body 37, the passage holes 92 and the passage holes 105 are alternately provided at equal pitches in the circumferential direction of the second piston body 37. Therefore, the second piston body 37 includes the passage holes 92 and the passage holes 105 that are equal in number. The number of passage holes 105 is the same as the number of passage holes 65 of the first piston body 36.

The protruding part 89 protrudes from the joint surface 81 to a side opposite to the inner seat 85 in the axial direction of the second piston body 37.

In the second piston body 37, passages in the plurality of passage holes 105 and a passage in the opening groove part 102 form a third passage 106.

In the second piston body 37, passages in the plurality of passage holes 92 and a passage in the passage groove 91 form a fourth passage 107. The fourth passage 107 includes a space portion between the inner seat 85 and the third seat 86. Therefore, the third seat 86 communicates with the fourth passage 107. The fourth passage 107 includes a space portion between the third seat 86 and the fourth seat 87. Therefore, the fourth seat 87 also communicates with the fourth passage 107.

The first seat 46 and the third seat 86 have the same shape. The second seat 47 and the fourth seat 87 have the same shape. The passage groove 51 and the passage groove 91 have the same shape. The passage holes 52 and the passage holes 92 have the same shape. The opening groove part 62 and the opening groove part 102 have the same shape. The passage holes 65 and the passage holes 105 have the same shape.

In the first piston body 36 and the second piston body 37, the protruding part 89 of the second piston body 37 is fitted to the recessed part 72 of the first piston body 36. As a result, the joint surface 41 of the first piston body 36 and the joint surface 81 of the second piston body 37 are in surface contact with each other. In this state, the central axis of the first piston body 36 and the central axis of the second piston body 37 coincide with each other.

Also, in this state, the passage holes 52 of the first piston body 36 overlap the passage holes 105 of the second piston body 37 in position in the circumferential direction and radial direction of the first piston body 36 and the second piston body 37. On the other hand, the passage holes 52 of the first piston body 36 do not overlap the passage holes 92 in position in the circumferential direction and radial direction of the first piston body 36 and the second piston body 37. In other words, in this state, the first passage 75 of the first piston body 36 communicates with the third passage 106 of the second piston body 37 but does not communicate with the fourth passage 107.

Also, in this state, the passage holes 65 of the first piston body 36 overlap the passage holes 92 of the second piston body 37 in the circumferential direction and radial direction of the first piston body 36 and the second piston body 37. On the other hand, the passage holes 65 of the first piston body 36 do not overlap the passage holes 105 in position in the circumferential direction and radial direction of the first piston body 36 and the second piston body 37. In other words, in this state, the second passage 76 of the first piston body 36 communicates with the fourth passage 107 of the second piston body 37 but does not communicate with the third passage 106.

In this way, positions of the first piston body 36 and the second piston body 37 are aligned when the protruding part 89 is fitted to the recessed part 72. Positions of the first piston body 36 and the second piston body 37 are not aligned in a connection state other than that. In other words, in a state other than that, the first piston body 36 and the second piston body 37 are not in a state in which the first passage 75 communicates with the third passage 106, the second passage 76 communicates with the fourth passage 107, and the joint surface 41 and the joint surface 81 are in surface contact with each other as described above.

The protruding part 89 and the recessed part 72 form a positioning part 121. The positioning part 121 is provided on the joint surfaces 41 and 81 at which the first piston body 36 and the second piston body 37 are connected to each other. The positioning part 121 aligns positions of the first passage 75 and the third passage 106 and aligns positions of the second passage 76 and the fourth passage 107 in the circumferential direction and radial direction of the first piston body 36 and the second piston body 37.

The first piston body 36 and the second piston body 37 are integrated with each other in a fixed state when the protruding part 89 is press-fitted into the recessed part 72. At that time, the first piston body 36 and the second piston body 37 are positioned in the circumferential direction and radial direction by the positioning part 121 so that the first passage 75 and the third passage 106 are communicated with each other, the second passage 76 and the fourth passage 107 are communicated with each other, and the joint surface 41 and the joint surface 81 are brought into surface contact with each other. In other words, the first piston body 36 and the second piston body 37 are connected so that the first passage 75 communicates with the third passage 106, and the second passage 76 communicates with the fourth passage 107.

The first piston body 36, in a state of being integrated with the second piston body 37 as described above, is formed by processing of cutting the inner seat 45, the first seat 46, and the second seat 47. In other words, the first piston body 36 is formed by processing of cutting an end portion of the first passage 75 opposite to the third passage 106.

Also, the second piston body 37, in a state of being integrated with the first piston body 36, is formed by processing of cutting the inner seat 85, the third seat 86, and the fourth seat 87. In other words, the second piston body 37 is formed by processing of cutting an end portion of the fourth passage 107 opposite to the second passage 76.

After the processing of these, the first seat 46 and the third seat 86 are mirror-symmetrical. Also, after the processing of these, the second seat 47 and the fourth seat 87 are mirror-symmetrical. Also, after the processing of these, a height difference between the inner seat 45 and the first seat 46 is larger than a height difference between the inner seat 85 and the third seat 86 by a predetermined amount.

Figure 3:
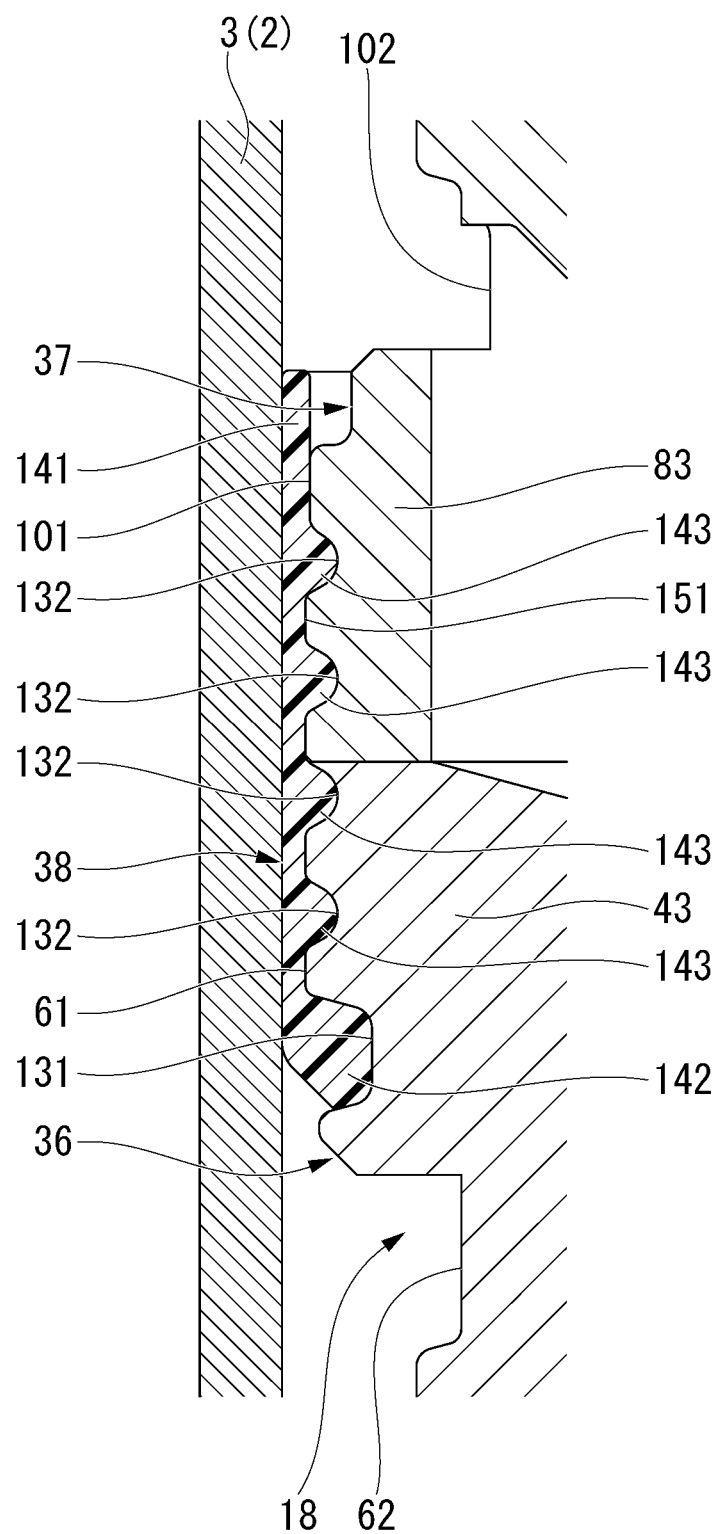
FIG. 3 is a partial cross-sectional view of a main part showing the shock absorber of one embodiment according to the present invention.

Also, the outer circumferential portions of the first piston body 36 and the second piston body 37 in the integrated state are cut at one time. At that time, the opening groove part 62 of the first piston body 36 is formed and the opening groove part 102 of the second piston body 37 is formed. In other words, the first piston body 36 is formed by processing of cutting an end portion of the second passage 76 opposite to the fourth passage 107. The second piston body 37 is formed by processing of cutting an end portion of the third passage 106 opposite to the first passage 75. In addition, a deep groove part 131 (groove) shown in FIG. 3 is formed in the outer circumferential portion of the first piston body 36 by cutting processing. At the same time, the outer circumferential surfaces 61 and 101 and a plurality of (specifically, four) shallow groove parts 132 (grooves) are formed on the outer circumferential portions of the first piston body 36 and the outer circumferential portion of the second piston body 37 by cutting processing. The outer circumferential surfaces 61 and 101 are formed to have the same cylindrical surface.

The deep groove part 131 is recessed inward in the radial direction of the first piston body 36 from the outer circumferential surface 101. The deep groove part 131 has an annular shape centered on the central axis of the first piston body 36. The deep groove part 131 is formed at a portion on the second piston body 37 side with respect to the opening groove part 62 of the first piston body 36 in the axial direction.

The plurality of shallow groove parts 132 have the same shape and are recessed inward in the radial direction of the first piston body 36 and the second piston body 37 from the outer circumferential surfaces 61 and 101. The plurality of shallow groove parts 132 all have an annular shape centered on the central axes of the first piston body 36 and the second piston body 37. Depths of the plurality of shallow groove parts 132 from the outer circumferential surfaces 61 and 101 are smaller than a depth of the deep groove part 131 from the outer circumferential surfaces 61 and 101. In other words, the depth of the deep groove part 131 from the outer circumferential surfaces 61 and 101 is larger than the depths of the plurality of shallow groove parts 132 from the outer circumferential surfaces 61 and 101. In other words, a diameter of a bottom part of the deep groove part 131 is smaller than diameters of bottom parts of the plurality of shallow groove parts 132.

The plurality of shallow groove parts 132 are formed in a portion of the first piston body 36 on the second piston body 37 side with respect to the deep groove part 131 in the axial direction, and a portion of the second piston body 37 on the first piston body 36 side with respect to the opening groove part 102. In other words, the deep groove part 131 is on the second seat 47 side shown in FIG. 4 with respect to the plurality of shallow groove parts 132 in the axial direction of the first piston body 36 and the second piston body 37. As shown in FIG. 3, the plurality of shallow groove parts 132 are disposed to be aligned at regular intervals in the axial direction of the first piston body 36 and the second piston body 37.

The piston band 38 is made of a synthetic resin and formed in an endless strip shape. The piston band 38 includes a base body part 141, a deep groove fitting part 142, and a plurality of (specifically, four) shallow groove fitting parts 143.

The base body part 141 has an endless strip shape with a certain thickness.

The deep groove fitting part 142 protrudes inward in the radial direction of the base body part 141 from a cylindrical surface-shaped inner circumferential surface 151 of the base body part 141. The deep groove fitting part 142 is provided at one end of the base body part 141 in the axial direction. The deep groove fitting part 142 has an endless annular shape that continues over the entire circumference of the base body part 141.

The plurality of shallow groove fitting parts 143 have the same shape and protrude inward in the radial direction of the base body part 141 from the inner circumferential surface 151 of the base body part 141. The plurality of shallow groove fitting parts 143 are provided at an intermediate position in the axial direction of the base body part 141. The plurality of shallow groove fitting parts 143 all have an endless annular shape that is continuous over the entire circumference of the base body part 141. The plurality of shallow groove fitting parts 143 are disposed to be aligned at regular intervals in the axial direction of the base body part 141. Protrusion heights of the plurality of shallow groove fitting parts 143 from the inner circumferential surface 151 of the base body part 141 is smaller than a protrusion height of the deep groove fitting part 142 from the inner circumferential surface 151. In other words, in the piston band 38, inner diameters of the shallow groove fitting parts 143 are larger than an inner diameter of the deep groove fitting part 142.

The piston band 38 is attached to cover the outer circumferential portions of the first piston body 36 and the second piston body 37 integrated by press-fitting as described above. At that time, the piston band 38, in a state of being elastically deformed to increase the diameter, covers the first piston body 36 and the second piston body 37 that is shown in FIG. 3 from the second seat 47 side shown in FIG. 4 with a side opposite to the deep groove fitting part 142 in the axial direction as the front. Then, in the piston band 38, the deep groove fitting part 142 is first fitted to the deep groove part 131 of the first piston body 36 when the increased diameter state is released, and then the plurality of shallow groove fitting parts 143 are fitted to the plurality of shallow groove parts 132 to have a one-to-one correspondence when the increased diameter state is released. Then, the inner circumferential surface 151 of the base body part 141 comes into surface contact with the outer circumferential surfaces 61 and 101 of the first piston body 36 and the second piston body 37 to be in close contact.

In this manner, the piston band 38 is integrally attached to the outer circumferential surfaces 61 and 101 of the first piston body 36 and the second piston body 37 to form the piston 18. The piston 18 is constituted by only three parts of the first piston body 36, the second piston body 37, and the piston band 38.

The piston 18 is formed to include a first step, a second step, and a third step. As shown in FIG. 2, the first step is a step of connecting the joint surface 41 that is one side of the first piston body 36 and the joint surface 81 that is one side of the second piston body 37 so that the first passage 75 communicates with the third passage 106, and the second passage 76 communicates with the fourth passage 107. The second step is a step of processing an end portion of the first passage 75 opposite to the third passage 106, an end portion of the third passage 106 opposite to the first passage 75, an end portion of the second passage 76 opposite to the fourth passage 107, an end portion of the fourth passage 107 opposite to the second passage 76, and the deep groove part 131 and the plurality of shallow groove parts 132 to which the piston band 38 is attached as shown in FIG. 3. The third step is a step of attaching the piston band 38 to the deep groove part 131 and the plurality of shallow groove parts 132. In the third step, the piston band 38 is attached to the deep groove part 131 via the second seat 47 shown in FIG. 2, and then is attached to the plurality of shallow groove parts 132.

The piston 18 is fitted to the fitting shaft part 32 of the piston rod 21 such that the second piston body 37 is disposed between the first piston body 36 and the shaft step part 29 in the axial direction of the piston rod 21. At that time, the piston 18 is positioned in the radial direction with respect to the piston rod 21 by fitting the through hole 82 of the second piston body 37 and the through hole 42 of the first piston body 36 onto the fitting shaft part 32.

In the piston 18 in a state of being connected to the piston rod 21, the first seat 46 and the second seat 47 of the first piston body 36 are disposed on the second chamber 20 side, and the third seat 86 and the fourth seat 87 of the second piston body 37 are disposed on the first chamber 19 side. The piston 18 slides with respect to the inner tube 3 while the outer circumferential surface of the piston band 38 is in contact with the inner circumferential surface of the inner tube 3.

Figure 4:
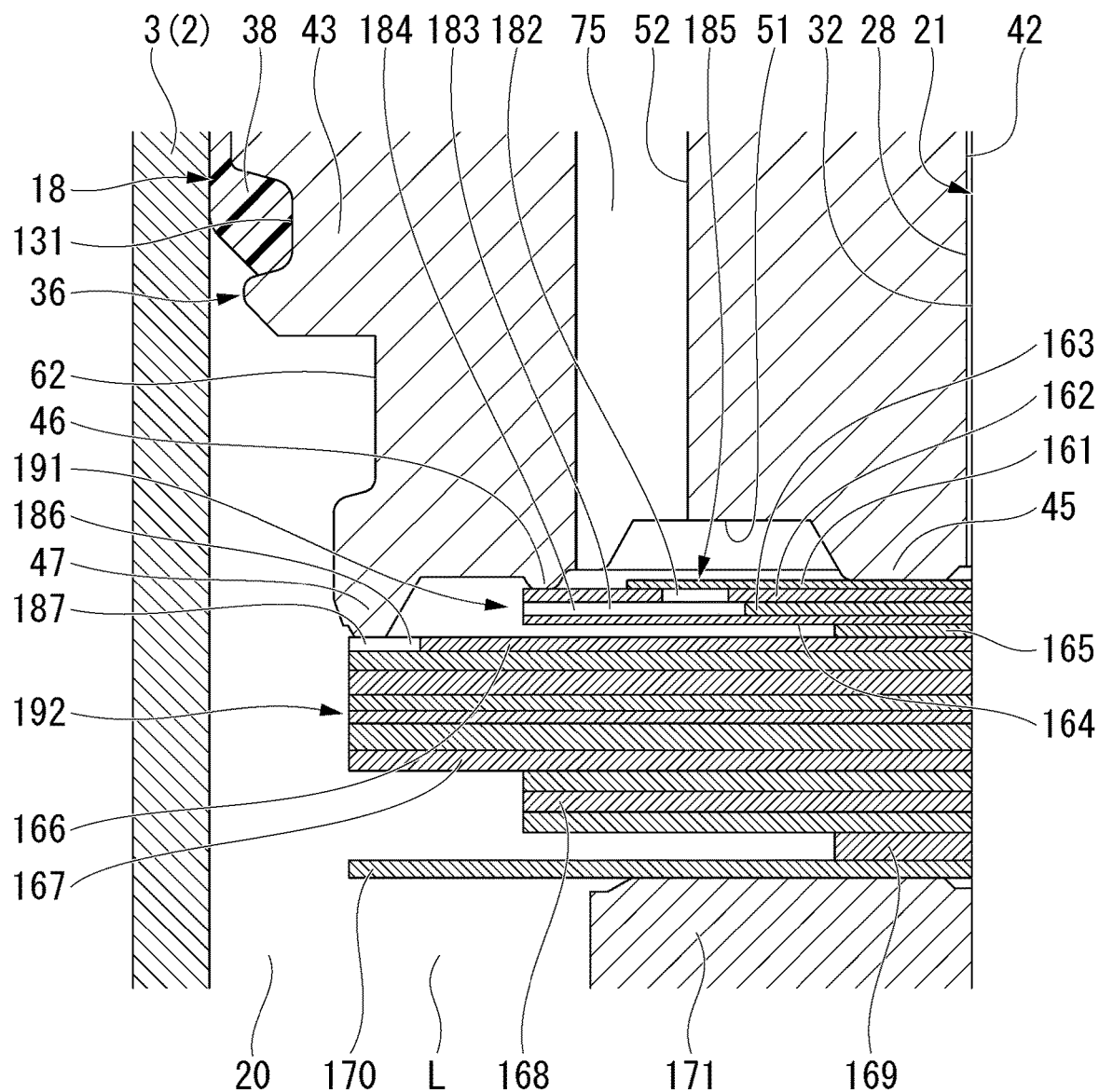
FIG. 4 is a partial cross-sectional view of a main part showing the shock absorber of one embodiment according to the present invention.

As shown in FIG. 4, one disc 161, one disc 162, one disc 163, one disc 164, one disc 165, one disc 166, a plurality of (specifically, six) discs 167, a plurality of (specifically, three) discs 168, one disc 169, one disc 170, and one annular member 171 are stacked on the inner seat 45 of the piston 18 in order from the inner seat 45 side in the axial direction of the piston 18. The number of discs shown here is one embodiment and can be appropriately adjusted according to desired damping force characteristics.

The discs 161 to 170 and the annular member 171 are all made of a metal. The discs 161 to 170 are all formed in a bored circular flat plate shape each having a certain thickness. The annular member 171 has an annular shape. The fitting shaft part 32 of the piston rod 21 is fitted to an inner side of all the discs 161 to 170 and the annular member 171.

The disc 161 has an outer diameter larger than an outer diameter of the inner seat 45 of the piston 18 and smaller than an inner diameter of the first seat 46.

The disc 162 has an outer diameter larger than an outer diameter of the first seat 46 of the piston 18 and smaller than an inner diameter of the second seat 47 of the piston 18. The disc 162 is separated from and comes in contact with the first seat 46 to open and close the first passage 75 at a position of the first seat 46. The disc 162 has a passage hole 182 formed at a position between the inner seat 45 of the piston 18 and an outer circumferential portion of the disc 161. The passage hole 182 penetrates the disc 162 in the axial direction of the disc 162. The passage hole 182 is an arcuate elongated hole extending in the circumferential direction of the disc 162. The passage hole 182 is opened and closed by the disc 161.

The disc 163 has an outer diameter equal to the outer diameter of the disc 162. A notch part 183 is formed in an outer circumferential portion of the disc 163. The notch part 183 penetrates the disc 163 in the axial direction of the disc 163. The notch part 183 opens to the outer circumferential portion of the disc 163. A plurality of notch parts 183 are formed in the disc 163 at regular intervals in the circumferential direction of the disc 163. Inner portions of the plurality of notch parts 183 in the radial direction of the disc 163 communicate with the passage hole 182 of the disc 162. The plurality of notch parts 183 and the passage hole 182 constitute a fixed orifice 184. The fixed orifice 184 is opened and closed by the disc 161. The discs 161 and 162 constitute a check valve 185. The check valve 185 allows a flow of the oil fluid L from the fixed orifice 184 to the passage in the passage groove 51 and restricts a flow of the oil fluid L from the passage in the passage groove 51 to the fixed orifice 184.

The disc 164 has an outer diameter equal to the outer diameter of the disc 163. The disc 164 covers the plurality of notch parts 183 of the disc 163 from a side opposite to the disc 162 to form the fixed orifice 184. Therefore, the fixed orifice 184 and the check valve 185 that allows the oil fluid L to flow in only one direction to the fixed orifice 184 are formed by a plurality of laminated discs 161 to 164.

The disc 165 has an outer diameter smaller than the outer diameter of the disc 164 and slightly larger than the outer diameter of the inner seat 45.

The disc 166 has an outer diameter equal to an outer diameter of the second seat 47 of the piston 18. The disc 166 is separated from and comes in contact with the second seat 47 to open and close the first passage 75 at a position of the second seat 47. A notch part 186 is formed in an outer circumferential portion of the disc 166. The notch part 186 penetrates the disc 166 in the axial direction of the disc 166. The notch part 186 opens to the outer circumferential portion of the disc 166. A plurality of notch parts 186 are formed in the disc 166 at regular intervals in the circumferential direction of the disc 166. The plurality of notch parts 186 extend to cross the second seat 47 in the radial direction. The plurality of notch parts 186 form a fixed orifice 187 in the first passage 75 with the disc 166 in contact with the second seat 47. A flow path cross-sectional area of the fixed orifice 187 is larger than a flow path cross-sectional area of the fixed orifice 184.

The plurality of discs 167 have the same outer diameter, and outer diameters thereof are each the same as the outer diameter of the disc 166. Of the plurality of discs 167, the disc 167 on a side closest to the disc 166 covers the plurality of notch parts 186 of the disc 166 from a side opposite to the second seat 47 to form the fixed orifice 187.

The plurality of discs 168 have the same outer diameter, and outer diameters thereof are each smaller than the outer diameter of the disc 167 and larger than the outer diameter of the disc 165.

The disc 169 has an outer diameter smaller than the outer diameter of the disc 168 and equal to the outer diameter of the disc 165.

The disc 170 has an outer diameter larger than the outer diameter of the disc 169 and equal to the outer diameter of the disc 167.

The annular member 171 has an outer diameter smaller than the outer diameter of the disc 170 and larger than the outer diameter of the disc 169. The annular member 171 has a thickness larger than that of each of the discs 161 to 170 and has a higher rigidity than the discs 161 to 170.

The first passage 75 and the third passage 106 shown in FIG. 2 form a flow path through which the oil fluid L flows from the first chamber 19 toward the second chamber 20 during the extension stroke. The third passage 106 is in constant communication with the first chamber 19.

As shown in FIG. 4, the discs 162 to 164 are placed on the first seat 46 to form a first damping valve 191 that opens and closes the first passage 75 by being separated from and coming into contact with the first seat 46. The fixed orifice 184 and the check valve 185 are provided in the first damping valve 191.

The discs 166 to 168 are placed on the second seat 47 to form a second damping valve 192 that opens and closes the first passage 75 by being separated from and coming into contact with the second seat 47. The fixed orifice 187 is provided in the second damping valve 192. The second damping valve 192 is provided on the second chamber 20 side with respect to the first damping valve 191. A total thickness of the discs 166 to 168 of the second damping valve 192 is larger than a total thickness of the discs 162 to 164 of the first damping valve 191. The second damping valve 192 has a higher rigidity than the first damping valve 191.

When the first damping valve 191 is separated from the first seat 46 and opens, the first damping valve 191 allows the oil fluid L to flow from the first chamber 19 shown in FIG. 2 to the second chamber 20 side through the third passage 106 and all the passages forming the first passage 75 including the passages in the plurality of passage holes 52, the passage in the passage groove 51, and a passage between the first damping valve 191 and the first seat 46. At that time, the first damping valve 191 suppresses a flow of the oil fluid L to generate a damping force. The first damping valve 191 is provided in the first passage 75 to generate a damping force by suppressing the flow of the oil fluid L that occurs during the extension stroke.

Since the second damping valve 192 has a higher rigidity than the first damping valve 191, the second damping valve 192 is separated from the second seat 47 to open after the first damping valve 191 is separated from the first seat 46 and opened. When the second damping valve 192 is separated from the second seat 47 and opens, the second damping valve 192 allows the oil fluid L to flow from the first chamber 19 to the second chamber 20 side through the third passage 106 and all the passages forming the first passage 75 including the passages in the plurality of passage holes 52, the passage in the passage groove 51, the passage between the first damping valve 191 and the first seat 46, a passage between the first seat 46 and the second seat 47, and a passage between the second damping valve 192 and the second seat 47. At that time, the second damping valve 192 suppresses a flow of the oil fluid L to generate a damping force. The second damping valve 192 is provided in the first passage 75 to generate a damping force by suppressing the flow of the oil fluid L that occurs during the extension stroke.

The first damping valve 191 is provided on an upstream side of the second damping valve 192 in a flow direction of the oil fluid L in the extension stroke. The first damping valve 191 has a lower rigidity and a lower valve opening pressure than the second damping valve 192. Therefore, the first damping valve 191 opens in a region in which a moving speed of the piston 18 (hereinafter referred to as a piston speed) is lower than that of the second damping valve 192.

As described above, the first piston body 36 includes the first seat 46 and the second seat 47. The first seat 46 communicates with the first passage 75, and on which the first damping valve 191 that opens at a low piston speed is placed. The second seat 47 has a larger diameter than the first seat 46, is provided on the second chamber 20 side with respect to the first seat 46, and on which the second damping valve 192 that opens after the first damping valve 191 opens is placed.

The check valve 185 provided in the first damping valve 191 closes for a flow in a direction from the first chamber 19 to the second chamber 20 during the extension stroke.

Figure 5:
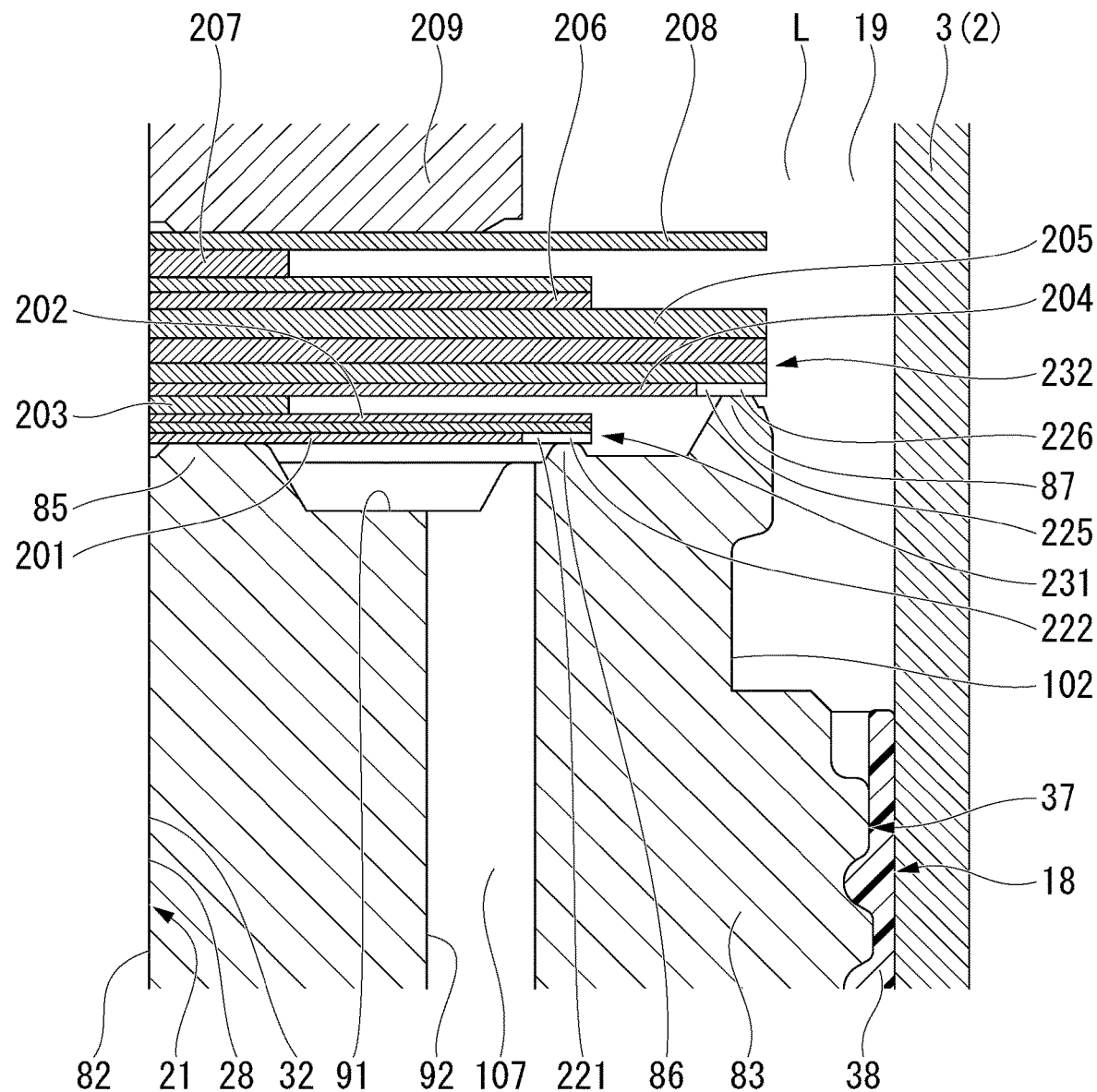
FIG. 5 is a partial cross-sectional view of a main part showing the shock absorber of one embodiment according to the present invention.

As shown in FIG. 5, one disc 201, a plurality of (specifically, two) discs 202, one disc 203, one disc 204, a plurality of (specifically, three) discs 205, a plurality of (specifically, two) discs 206, one disc 207, one disc 208, and one annular member 209 are stacked on the inner seat 85 of the piston 18 in order from the inner seat 85 side in the axial direction of the piston 18. The number of discs shown here is one embodiment and can be appropriately adjusted according to desired damping force characteristics.

The discs 201 to 208 and the annular member 209 are all made of a metal. The discs 201 to 208 are all formed in a bored circular flat plate shape each having a certain thickness. The annular member 209 has an annular shape. The fitting shaft part 32 of the piston rod 21 is fitted to an inner side of all the discs 201 to 208 and the annular member 209.

The disc 201 has an outer diameter larger than an outer diameter of the third seat 86 of the piston 18 and smaller than an inner diameter of the fourth seat 87 of the piston 18. The disc 201 is separated from and comes in contact with the third seat 86 to open and close the fourth passage 107 at a position of the third seat 86. A notch part 221 is formed in an outer circumferential portion of the disc 201. The notch part 221 penetrates the disc 201 in the axial direction of the disc 201. The notch part 221 opens to the outer circumferential portion of the disc 201. A plurality of notch parts 221 are formed in the disc 201 at regular intervals in the circumferential direction of the disc 201. The plurality of notch parts 221 extend to cross the third seat 86 in the radial direction. The plurality of notch parts 221 form a fixed orifice 222 in the fourth passage 107 with the disc 201 in contact with the third seat 86.

The plurality of discs 202 have the same outer diameter, and outer diameters thereof are each the same as the outer diameter of the disc 201. Of the plurality of discs 202, the disc 202 on a side closest to the disc 201 covers the plurality of notch parts 221 of the disc 201 from a side opposite to the third seat 86 to form the fixed orifice 222.

The disc 203 has an outer diameter smaller than the outer diameter of the disc 202 and slightly larger than an outer diameter of the inner seat 85.

The disc 204 has an outer diameter larger than an outer diameter of the fourth seat 87 of the piston 18. The disc 204 is separated from and comes in contact with the fourth seat 87 to open and close the fourth passage 107 at a position of the fourth seat 87. A notch part 225 is formed in an outer circumferential portion of the disc 204. The notch part 225 penetrates the disc 204 in the axial direction of the disc 204. The notch part 225 opens to the outer circumferential portion of the disc 204. A plurality of notch parts 225 are formed in the disc 204 at regular intervals in the circumferential direction of the disc 204. The plurality of notch parts 225 extend to cross the fourth seat 87 in the radial direction. The plurality of notch parts 225 form a fixed orifice 226 in the fourth passage 107 with the disc 204 in contact with the fourth seat 87. A flow path cross-sectional area of the fixed orifice 226 is larger than a flow path cross-sectional area of the fixed orifice 222.

The plurality of discs 205 have the same outer diameter, and outer diameters thereof are each equal to the outer diameter of the disc 204. Of the plurality of discs 205, the disc 205 on a side closest to the disc 204 covers the plurality of notch parts 225 of the disc 204 from a side opposite to the fourth seat 87 to form the fixed orifice 226.

The plurality of discs 206 have the same outer diameter, and outer diameters thereof are each smaller than the outer diameter of the disc 205 and larger than the outer diameter of the disc 203.

The disc 207 has an outer diameter smaller than the outer diameter of the disc 206 and equal to the outer diameter of the disc 203.

The disc 208 has an outer diameter larger than the outer diameter of the disc 207 and equal to the outer diameter of the disc 205.

The annular member 209 has an outer diameter smaller than the outer diameter of the disc 208 and larger than the outer diameter of the disc 207. The annular member 209 has a thickness larger than that of each of the discs 201 to 208 and has a higher rigidity than the discs 201 to 208.

As shown in FIG. 2, the fourth passage 107 and the second passage 76 form a flow path through which the oil fluid L flows from the second chamber 20 toward the first chamber 19 mainly during the compression stroke. The second passage 76 is in constant communication with the second chamber 20.

The discs 201 and 202 shown in FIG. 5 are placed on the third seat 86 to form a third damping valve 231 that opens and closes the fourth passage 107 by being separated from and coming into contact with the third seat 86. The fixed orifice 222 is provided in the third damping valve 231.

The discs 204 to 206 are placed on the fourth seat 87 to form a fourth damping valve 232 that opens and closes the fourth passage 107 by being separated from and coming into contact with the fourth seat 87. The fixed orifice 226 is provided in the fourth damping valve 232. The fourth damping valve 232 is provided on the first chamber 19 side with respect to the third damping valve 231. The fourth damping valve 232 has a total thickness of the discs 204 to 206 that is larger than a total thickness of the discs 201 and 202 of the third damping valve 231 and has a higher rigidity than the third damping valve 231.

When the third damping valve 231 is separated from the third seat 86 and opens, the third damping valve 231 allows the oil fluid L to flow from the second chamber 20 shown in FIG. 2 to the first chamber 19 side through the second passage 76 and all the passages forming the fourth passage 107 including the passages in the plurality of passage holes 92, the passage in the passage groove 91, and a passage between the third damping valve 231 and the third seat 86. At that time, the third damping valve 231 suppresses the flow of the oil fluid L to generate a damping force. The third damping valve 231 is provided in the fourth passage 107 to generate a damping force by suppressing the flow of the oil fluid L that occurs during the compression stroke.

Since the fourth damping valve 232 has a higher rigidity than the third damping valve 231, the fourth damping valve 232 is separated from the fourth seat 87 to open after the third damping valve 231 is separated from the third seat 86 and opened. When the fourth damping valve 232 is separated from the fourth seat 87 and opens, the fourth damping valve 232 allows the oil fluid L to flow from the second chamber 20 to the first chamber 19 side through the second passage 76 and all the passages forming the fourth passage 107 including the passages in the plurality of passage holes 92, the passage in the passage groove 91, the passage between the third damping valve 231 and the third seat 86, the passage between the third seat 86 and the fourth seat 87, and a passage between the fourth damping valve 232 and the fourth seat 87. At that time, the fourth damping valve 232 suppresses the flow of the oil fluid L to generate a damping force. The fourth damping valve 232 is provided in the fourth passage 107 to generate a damping force by suppressing the flow of the oil fluid L that occurs during the compression stroke.

The third damping valve 231 is provided on an upstream side of the fourth damping valve 232 in a flow direction of the oil fluid L in the compression stroke. The third damping valve 231 has a lower rigidity and a lower valve opening pressure than the fourth damping valve 232. Therefore, the third damping valve 231 opens in a region in which the moving speed of the piston 18 is lower than that of the fourth damping valve 232.

As shown in FIG. 4, the check valve 185 provided in the first damping valve 191 opens for a flow of the oil fluid L from the second chamber 20 toward the first chamber 19 shown in FIG. 2 during the compression stroke. At this time, the check valve 185 shown in FIG. 4 allows the oil fluid L to flow substantially without generating a damping force. The check valve 185 opens for a flow toward the first chamber 19 shown in FIG. 2 and closes for a flow in the opposite direction.

As described above, the second piston body 37 includes the third seat 86 and the fourth seat 87. The third seat 86 communicates with the fourth passage 107 and, on which the third damping valve 231 that opens at a low piston speed is placed. The fourth seat 87 has a larger diameter than the third seat 86, is provided on the first chamber 19 side with respect to the third seat 86, and on which the fourth damping valve 232 that opens after the third damping valve 231 opens is placed.

The first piston body 36 includes the first passage 75 and the second passage 76 that allow the oil fluid L to flow between the first chamber 19 on one side and the second chamber 20 on the other side in the cylinder 2 due to movement of the piston 18. The second piston body 37 includes the third passage 106 and the fourth passage 107 that allow the oil fluid L to flow between the first chamber 19 on one side and the second chamber 20 on the other side in the cylinder 2 due to movement of the piston 18.

In the piston rod 21, the annular member 209 is placed on the shaft step part 29 with the mounting shaft part 28 inserted through the inside. Then, as shown in FIG. 5, the disc 208, the disc 207, the plurality of discs 206, the plurality of discs 205, the disc 204, the disc 203, the plurality of discs 202, the disc 201, and the piston 18 are stacked in that order on the annular member 209 with the mounting shaft part 28 inserted through the inside of them. In addition, as shown in FIG. 4, the disc 161, the disc 162, the disc 163, the disc 164, the disc 165, the disc 166, the plurality of discs 167, the plurality of discs 168, the disc 169, the disc 170, and the annular member 171 are stacked in that order on the piston 18 with the mounting shaft part 28 inserted through the inside of them. In this state, the parts from the annular member 209 to the annular member 171 are fitted to the fitting shaft part 32 of the mounting shaft part 28. In this state, as shown in FIG. 2, a nut 241 is screwed onto the screw shaft part 31 of the mounting shaft part 28 that protrudes from the annular member 171. As a result, inner circumferential sides of the parts from the annular member 209 to the annular member 171 are clamped together in the axial direction by the shaft step part 29 of the piston rod 21 and the nut 241.

As shown in FIG. 1, the base member 26 of the base valve 25 is provided between the bottom part 12 of the outer tube 4 and the inner tube 3. The base valve 25 includes a disc valve 252, a disc valve 253 and a mounting pin 254 in addition to the base member 26. The disc valve 252 is provided on a lower side of the base member 26, that is, on the reservoir chamber 6 side. The disc valve 253 is provided on an upper side of the base member 26, that is, on the second chamber 20 side. The mounting pin 254 attaches the disc valve 252 and the disc valve 253 to base member 26.

The base member 26 has an annular shape, and the mounting pin 254 is inserted through a center in the radial direction. A plurality of passage holes 255 and a plurality of passage holes 256 are formed in the base member 26. The plurality of passage holes 255 allow the oil fluid L to flow between the second chamber 20 and the reservoir chamber 6. The plurality of passage holes 256 are on an outer side of the plurality of passage holes 255 in the radial direction of the base member 26. The plurality of passage holes 256 allow the oil fluid L to flow between the second chamber 20 and the reservoir chamber 6. The disc valve 252 on the reservoir chamber 6 side allows a flow of the oil fluid L from the second chamber 20 to the reservoir chamber 6 through the passage holes 255. On the other hand, the disc valve 252 suppresses a flow of the oil fluid L from the reservoir chamber 6 to the second chamber 20 through the passage holes 255. The disc valve 253 allows a flow of the oil fluid L from the reservoir chamber 6 to the second chamber 20 through the passage holes 256. On the other hand, the disc valve 253 suppresses a flow of the oil fluid L from the second chamber 20 to the reservoir chamber 6 through the passage holes 256.

The disc valve 252, together with the base member 26, forms a damping valve mechanism 257. The damping valve mechanism 257 opens during the compression stroke of the shock absorber 1 to allow the oil fluid L to flow from the second chamber 20 to the reservoir chamber 6 and generate a damping force. The disc valve 253, together with the base member 26, forms a suction valve mechanism 258. The suction valve mechanism 258 opens during the extension stroke of the shock absorber 1 to allow the oil fluid L to flow from the reservoir chamber 6 into the second chamber 20. Further, the suction valve mechanism 258 performs a function of allowing the oil fluid L to flow from the reservoir chamber 6 to the second chamber 20 substantially without generating a damping force to supplement a shortage of the liquid caused mainly by extension of the piston rod 21 from the cylinder 2.

Next, a main operation of the shock absorber 1 will be explained.

"Extension Stroke"

{First Region in which Piston Speed is Lower than First Predetermined Value}

In a first region of the extension stroke, the oil fluid L from the first chamber 19 does not flow to the second chamber 20 through the third passage 106 and the first passage 75 because the check valve 185 of the first damping valve 191 is closed. Therefore, the oil fluid L from the first chamber 19 flows to the second chamber 20 through all the passages forming the fourth passage 107 including the fixed orifice 226 of the fourth damping valve 232, a passage between the third seat 86 and the fourth seat 87, the fixed orifice 222 of the third damping valve 231, the passage in the passage groove 91, and the passages in the plurality of passage holes 92, and furthermore through the second passage 76. Therefore, in the first region of the extension stroke, a damping force having orifice characteristics (in which the damping force is substantially proportional to the square of the piston speed) due to a flow path cross-sectional area a of the fixed orifice 222 is generated.

{Second Region in which Piston Speed is Equal to or Higher than First Predetermined Value and Lower than Second Predetermined Value Larger than First Predetermined Value}

In a second region of the extension stroke, the oil fluid L from the first chamber 19, on the other hand, flows to the second chamber 20 through the third passage 106 and all the passages forming the first passage 75 including the passages in the plurality of passage holes 52, the passage in the passage groove 51, the passage between the first damping valve 191 that opens and the first seat 46, the passage between the first seat 46 and the second seat 47, and the fixed orifice 187 of the second damping valve 192. The oil fluid L from the first chamber 19, on the other hand, flows to the second chamber 20 through all the passages forming the fourth passage 107 including the fixed orifice 226 of the fourth damping valve 232, the passage between the third seat 86 and the fourth seat 87, the fixed orifice 222 of the third damping valve 231, the passage in the passage groove 91, and the passages in the plurality of passage holes 92, and furthermore through the second passage 76. Therefore, in the second region of the extension stroke, a damping force having characteristics combining valve characteristics (in which the damping force is substantially proportional to the piston speed) due to the first damping valve 191 and the orifice characteristics (in which the damping force is substantially proportional to the square of the piston speed) due to the flow path cross-sectional area a of the fixed orifice 222 is generated.

{Third Region in which Piston Speed is Equal to or Higher than Second Predetermined Value and Lower than Third Predetermined Value Larger than Second Predetermined Value}

In a third region of the extension stroke, the oil fluid L from the first chamber 19, on the other hand, flows to the second chamber 20 through the third passage 106 and all the passages forming the first passage 75 including the passages in the plurality of passage holes 52, the passage in the passage groove 51, the passage between the first damping valve 191 that opens and the first seat 46, the passage between the first seat 46 and the second seat 47, and the fixed orifice 187 of the second damping valve 192. At that time, the flow of the oil fluid L is reduced by the fixed orifice 187. The oil fluid L from the first chamber 19, on the other hand, flows to the second chamber 20 through all the passages forming the fourth passage 107 including the fixed orifice 226 of the fourth damping valve 232, the passage between the third seat 86 and the fourth seat 87, the fixed orifice 222 of the third damping valve 231, the passage in the passage groove 91, and the passages in the plurality of passage holes 92, and furthermore through the second passage 76. Therefore, in the third region of the extension stroke, a damping force having characteristics combining orifice characteristic due to flow path cross-sectional area B of the fixed orifice 187 and the orifice characteristics due to the flow path cross-sectional area a of the fixed orifice 222 is generated.

{Fourth Region in which Piston Speed is Equal to or Higher than Third Predetermined Value}

In a fourth region of the extension stroke, the oil fluid L from the first chamber 19, on the other hand, flows to the second chamber 20 through the third passage 106 and all the passages forming the first passage 75 including the passages in the plurality of passage holes 52, the passage in the passage groove 51, the passage between the first damping valve 191 that opens and the first seat 46, the passage between the first seat 46 and the second seat 47, and the passage between the second damping valve 192 that opens and the second seat 47. The oil fluid L from the first chamber 19, on the other hand, flows to the second chamber 20 through all the passages forming the fourth passage 107 including the fixed orifice 226 of the fourth damping valve 232, the passage between the third seat 86 and the fourth seat 87, the fixed orifice 222 of the third damping valve 231, the passage in the passage groove 91, and the passages in the plurality of passage holes 92, and furthermore through the second passage 76. Therefore, in the fourth region of the extension stroke, a damping force having characteristics combining valve characteristic due to the second damping valve 192 and the orifice characteristics due to the flow path cross-sectional area a of the fixed orifice 222 is generated.

"Compression Stroke"

{Fifth Region in which Piston Speed is Lower than Fifth Predetermined Value}

In a fifth region of the compression stroke, the oil fluid L from the second chamber 20, on the other hand, flows to the first chamber 19 through the second passage 76 and all the passages forming the fourth passage 107 including the passages in the plurality of passage holes 92, the passage in the passage groove 91, the fixed orifice 222 of the third damping valve 231, the passage between the third seat 86 and the fourth seat 87, and the fixed orifice 226 of the fourth damping valve 232. The oil fluid L from the second chamber 20, on the other hand, flows to the first chamber 19 through all the passages forming the first passage 75 including the fixed orifice 187 of the second damping valve 192, the passage between the first seat 46 and the second seat 47, the fixed orifice 184 of the first damping valve 191, the check valve 185 that opens, the passage in the passage groove 51, and the passages in the plurality of passage holes 52, and through the third passage 106. Therefore, in the fifth region of the compression stroke, a damping force having characteristics combining the orifice characteristics due to the flow path cross-sectional area a of the fixed orifice 222 of the third damping valve 231 and orifice characteristics due to a flow path cross-sectional area b of the fixed orifice 184 of the first damping valve 191 is generated.

{Sixth Region in which Piston Speed is Equal to or Higher than Fifth Predetermined Value and Lower than Sixth Predetermined Value Larger than Fifth Predetermined Value}

In a sixth region of the compression stroke, the oil fluid L from the second chamber 20, on the other hand, flows to the first chamber 19 through the second passage 76 and all the passages forming the fourth passage 107 including the passages in the plurality of passage holes 92, the passage in the passage groove 91, the passage between the third damping valve 231 that opens and the third seat 86, the passage between the third seat 86 and the fourth seat 87, and the fixed orifice 226 of the fourth damping valve 232. The oil fluid L from the second chamber 20, on the other hand, flows to the first chamber 19 through all the passages forming the first passage 75 including the fixed orifice 187 of the second damping valve 192, the passage between the first seat 46 and the second seat 47, the fixed orifice 184 of the first damping valve 191, the check valve 185 that opens, the passage in the passage groove 51, and the passages in the plurality of passage holes 52, and through the third passage 106. Therefore, in the sixth region of the compression stroke, a damping force having characteristics combining valve characteristics due to the third damping valve 231 and the orifice characteristics due to the flow path cross-sectional area b of the fixed orifice 184 of the first damping valve 191 is generated.

{Seventh Region in which Piston Speed is Equal to or Higher than Sixth Predetermined Value and Lower than Seventh Predetermined Value Larger than Sixth Predetermined Value}

In a seventh region of the compression stroke, the oil fluid L from the second chamber 20, on the other hand, flows to the first chamber 19 through the second passage 76 and all the passages forming the fourth passage 107 including the passages in the plurality of passage holes 92, the passage in the passage groove 91, the passage between open third damping valve 231 that opens and the third seat 86, the passage between the third seat 86 and the fourth seat 87, and the fixed orifice 226 of the fourth damping valve 232. At that time, the flow of the oil fluid L is reduced by the fixed orifice 226. The oil fluid L from the second chamber 20, on the other hand, flows to the first chamber 19 through all the passages forming the first passage 75 including the fixed orifice 187 of the second damping valve 192, the passage between the first seat 46 and the second seat 47, the fixed orifice 184 of the first damping valve 191, the check valve 185 that opens, the passage in the passage groove 51, and the passages in the plurality of passage holes 52, and through the third passage 106. Therefore, in the seventh region of the compression stroke, a damping force having characteristics combining orifice characteristics due to a flow path cross-sectional area A of the fixed orifice 226 of the fourth damping valve 232 and the orifice characteristics due to the flow path cross-sectional area b of the fixed orifice 184 of the first damping valve 191 is generated.

{Eighth Region in which Piston Speed is Equal to or Higher than Seventh Predetermined Value}

In an eighth region of the compression stroke, the oil fluid L from the second chamber 20, on the other hand, flows to the first chamber 19 through the second passage 76 and all the passages forming the fourth passage 107 including the passages in the plurality of passage holes 92, the passage in the passage groove 91, the passage between the third damping valve 231 that opens and the third seat 86, the passage between the third seat 86 and the fourth seat 87, and the passage between the fourth damping valve 232 that opens and the fourth seat 87. The oil fluid L from the second chamber 20, on the other hand, flows to the first chamber 19 through all the passages forming the first passage 75 including the fixed orifice 187 of the second damping valve 192, the passage between the first seat 46 and the second seat 47, the fixed orifice 184 of the first damping valve 191, the check valve 185 that opens, the passage in the passage groove 51, and the passages in the plurality of passage holes 52, and through the third passage 106. Therefore, in the seventh region of the compression stroke, a damping force having characteristics combining valve characteristics due to the fourth damping valve 232 and the orifice characteristics due to the flow path cross-sectional area b of the fixed orifice 184 of the first damping valve 191 is generated.

In the shock absorber 1, the check valve 185 is provided in the first damping valve 191 which is one of the first damping valve 191 and the third damping valve 231, which both open at a low piston speed, and a check valve is not provided in the third damping valve 231 which is the other thereof. Therefore, as described above, in the extension stroke, orifice characteristics before the first damping valve 191 opens are the characteristics only due to the flow path cross-sectional area a of the fixed orifice 222 of the third damping valve 231, and orifice characteristics after the first damping valve 191 opens are the characteristics due to the flow path cross-sectional area a of the fixed orifice 222 of the third damping valve 231 and the flow path cross-sectional area B of the fixed orifice 187 of the second damping valve 192. On the other hand, in the compression stroke, orifice characteristics before the third damping valve 231 opens are the characteristics due to the flow path cross-sectional area a of the fixed orifice 222 of the third damping valve 231 and the flow path cross-sectional area b of the fixed orifice 184 of the first damping valve 191, and orifice characteristics after the third damping valve 231 opens are the characteristics due to the flow path cross-sectional area A of the fixed orifice 226 of the fourth damping valve 232 and the flow path cross-sectional area b of the fixed orifice 184 of the first damping valve 191.

Further, in the above-described description, a case in which the fixed orifice 184 and the check valve 185 are provided in the first damping valve 191 has been described as an example. Alternatively, similar fixed orifice and a check valve may be provided in the third damping valve 231. In that case, for example, the entirety of the first damping valve 191 including the check valve 185, the piston 18, and the third damping valve 231, as it is, is reversed in the axial direction with respect to the above-described configuration and fitted to the fitting shaft part 32. Then, the reversed first damping valve 191 including the fixed orifice 184 and the check valve 185 serves as a third damping valve including a third fixed orifice and a third check valve, and the reversed third damping valve 231 serves as a first damping valve. The third check valve provided in the third damping valve in this manner allows a flow of the oil fluid L from the first chamber 19 to the second chamber 20 through the third fixed orifice, the fourth passage 107, and the second passage 76. Also, the third check valve restricts a flow of the oil fluid L from the second chamber 20 to the first chamber 19 through the second passage 76, the fourth passage 107, and the third fixed orifice.

Also, a configuration in which a second fixed orifice and a second check valve that allows the oil fluid L to flow in only one direction to the second fixed orifice are formed of laminated discs may be provided in the second damping valve 192. In this case, the second check valve allows a flow of the oil fluid L from the second chamber 20 to the first chamber 19 through the second fixed orifice, the first passage 75, and the third passage 106. Also, the second check valve restricts a flow of the oil fluid L from the first chamber 19 to the second chamber 20 through the third passage 106, the first passage 75, and the second fixed orifice. In that case, only a fixed orifice may be provided in the first damping valve 191 without providing the check valve 185. Also, both the first damping valve 191 including the fixed orifice 184 and the check valve 185 and the second damping valve 192 including the second fixed orifice and the second check valve may be provided.

Also, a configuration in which a fourth fixed orifice and a fourth check valve that allows the oil fluid L to flow in only one direction to the fourth fixed orifice are formed of laminated discs may be provided in the fourth damping valve 232. In this case, the fourth check valve allows a flow of the oil fluid L from the first chamber 19 to the second chamber 20 through the fourth fixed orifice, the fourth passage 107, and the second passage 76. Also, the fourth check valve restricts a flow of the oil fluid L from the second chamber 20 to the first chamber 19 through the second passage 76, the fourth passage 107, and the fourth fixed orifice. Both the third damping valve 231 including the third fixed orifice and the third check valve and the fourth damping valve 232 including the fourth fixed orifice and the fourth check valve may be provided.

Japanese Unexamined Patent Application, First Publication No. 2010-107003, Japanese Unexamined Patent Application, First Publication No. 2014-129865, Japanese Unexamined Patent Application, First Publication No. H2-113142, and the specification of United States Patent Application, Publication No. 2013/0037361 described above disclose a shock absorber in which a piston is constituted by a plurality of piston bodies. Also, the specification of United States Patent Application, Publication No. 2013/0037361 and Japanese Unexamined Utility Model Application, First Publication No. H1-149037 described above disclose a shock absorber including a valve and a valve that opens in a region in which a piston speed is higher than that of the above-described valve. Incidentally, in shock absorbers, there has been a demand to minimize an increase in the number of parts to suppress a decrease in productivity. For example, a shock absorber including a first damping valve and a second damping valve that opens in a region in which a piston speed is higher than that of the first damping valve on an extension side, and a third damping valve and a fourth damping valve that opens in a region in which a piston speed is higher than that of the third damping valve on a compression side may be configured. In this case, since the number of valves is large, it is likely to be accompanied by a decrease in productivity. For this, it is desirable to minimize an increase in the number of parts to suppress a decrease in productivity.

In the shock absorber 1 of the embodiment, the piston 18 includes the first piston body 36, the second piston body 37, and the piston band 38. The first piston body 36 includes the first passage 75, the second passage 76, the first seat 46, and the second seat 47. The first passage 75 and the second passage 76 allow the oil fluid L serving as a working fluid to flow between the first chamber 19 on one side and the second chamber 20 on the other side in the cylinder 2 due to movement of the piston 18. The first seat 46 communicates with the first passage 75, and on which the first damping valve 191 that opens at a low piston speed is placed. The second seat 47 has a larger diameter than the first seat 46, is provided on the second chamber 20 side, and on which the second damping valve 192 that opens after the first damping valve 191 opens is placed. The second piston body 37 includes the third passage 106, the fourth passage 107, the third seat 86, and the fourth seat 87. The third passage 106 and the fourth passage 107 allow the oil fluid L serving as a working fluid to flow between the first chamber 19 on one side and the second chamber 20 on the other side in the cylinder 2 due to movement of the piston 18. The third seat 86 communicates with the fourth passage 107, and on which the third damping valve 231 that opens at a low piston speed is placed. The fourth seat 87 has a larger diameter than the third seat 86, is provided on the first chamber 19 side, and on which the fourth damping valve 232 that opens after the third damping valve 231 opens is placed. Since the piston 18 includes the first piston body 36, the second piston body 37, and the piston band 38, the number of components of the piston 18 can be reduced. Therefore, man-hours for manufacturing each part constituting the piston 18 and man-hours for the assembly can be reduced. Also, the piston 18 can be assembled as a sub-assembly before being assembled to the piston rod 21. Therefore, man-hours for assembling parts to the piston rod 21 can be reduced. Therefore, a decrease in productivity can be suppressed. The shock absorber 1 has a structure in which the first damping valve 191, the second damping valve 192, the third damping valve 231, and the fourth damping valve 232 are placed on the piston 18, and this is a structure that is particularly likely to be accompanied by a decrease in productivity. Therefore, suppressing a decrease in productivity as described above greatly contributes to an effect of minimizing an increase in product costs of the shock absorber 1.

Also, the shock absorber 1 includes the positioning part 121 provided on the joint surfaces 41 and 81 of the first piston body 36 and the second piston body 37 that are connected to each other. The positioning part 121 aligns positions of the first passage 75 and the third passage 106 and aligns positions of the second passage 76 and the fourth passage 107. Therefore, positioning of these can be easily performed. Also, in the shock absorber 1, since an inner diameter of the first piston body 36 and an inner diameter of the second piston body 37 are different, when one of the first piston body 36 and the second piston body 37 having a smaller inner diameter is fitted to the piston rod 21, the piston 18 can be positioned on the piston rod 21. Therefore, when the first piston body 36 and the second piston body 37 are connected, the inner circumferential surfaces are not necessary to be aligned with each other. Therefore, a decrease in productivity can be further suppressed.

Also, the shock absorber 1 includes the check valve 185 that opens for a flow toward the first chamber 19 or the second chamber 20 and closes for a flow in the opposite direction in the first damping valve 191 or the third damping valve 231. Therefore, orifice characteristics before the first damping valve 191 or the third damping valve 231 opens can be made different between the extension stroke and the compression stroke. For example, when the check valve 185 is provided in the first damping valve 191 as described above, in the extension stroke, before the first damping valve 191 opens, orifice characteristics are due to the flow path cross-sectional area a of the fixed orifice 222, and after the first damping valve 191 opens, orifice characteristics are due to the flow path cross-sectional area a of the fixed orifice 222 and the flow path cross-sectional area B of the fixed orifice 187. In the compression stroke, before the third damping valve 231 opens, orifice characteristics are due to the flow path cross-sectional area a of the fixed orifice 222 and the flow path cross-sectional area b of the fixed orifice 184, and after the third damping valve 231 opens, orifice characteristics are due to the flow path cross-sectional area A of the fixed orifice 226 and the flow path cross-sectional area b of the fixed orifice 184.

A manufacturing method of the shock absorber 1 of the embodiment includes first to third steps. In the first step, the joint surface 41 of the first piston body 36 and the joint surface 81 of the second piston body 37 are connected so that the first passage 75 and the third passage 106 communicate, and the second passage 76 and the fourth passage 107 communicate. In the second step, an end portion of the first passage 75 opposite to the third passage 106, an end portion of the third passage 106 opposite to the first passage 75, an end portion of the second passage 76 opposite to the fourth passage 107, an end portion of the fourth passage 107 opposite to the second passage 76, and the deep groove part 131 and the shallow groove parts 132 to which the piston band 38 is attached are processed. In the third step, the piston band 38 is attached to the deep groove part 131 and the shallow groove parts 132. In this way, since the first piston body 36 and the second piston body 37 are processed in the second step while the first piston body 36 and the second piston body 37 are connected in the first step, relative accuracies between parts can be easily secured. Also, when the first to third steps are performed, the piston 18 can be assembled as a sub-assembly before being assembled to the piston rod 21. Therefore, man-hours for assembling parts to the piston rod 21 can be reduced. Therefore, a decrease in productivity can be suppressed.

In the third step, the piston band 38 is attached to the deep groove part 131 via the second seat 47, and then is attached to the plurality of shallow groove parts 132 having a depth smaller than that of the deep groove part 131. Therefore, the piston band 38 can be properly and smoothly attached to the first piston body 36 and the second piston body 37.

Further, in the embodiment, a hydraulic shock absorber has been shown as an example of the shock absorber 1, but the above-described structure can also be employed for a shock absorber using water or air as a working fluid.

EXPLANATION OF REFERENCES

1 Shock absorber
2 Cylinder
18 Piston
19 First chamber (chamber)
20 Second chamber (chamber)
21 Piston rod
36 First piston body
37 Second piston body
38 Piston band
41, 81 Joint surface
46 First seat
47 Second seat
75 First passage
76 Second passage
86 Third seat 87 Fourth seat
106 Third passage
107 Fourth passage
121 Positioning part
185 Check valve
191 First damping valve
192 Second damping valve
231 Third damping valve
232 Fourth damping valve

What is claimed is:

1. A shock absorber comprising:
a cylinder in which a working fluid is sealed;
a piston fitted in the cylinder to be slidable and partitioning an inside of the cylinder into two chambers; and
a piston rod connected to the piston and extending to an outside of the cylinder, wherein
the piston includes:
a first piston body having
   a first passage and a second passage configured to allow the working fluid to flow between the two chambers in the cylinder due to movement of the piston,
   a first seat communicating with the first passage and on which a first damping valve which opens at a low piston speed is placed, and
   a second seat having a larger diameter than the first seat, provided on a side of one of the two chambers, and on which a second damping valve which opens after the first damping valve opens is placed; and
a second piston body having
   a third passage and a fourth passage configured to allow the working fluid to flow between the two chambers in the cylinder due to movement of the piston,
   a third seat communicating with the fourth passage and on which a third damping valve which opens at a low piston speed is placed, and
   a fourth seat having a larger diameter than the third seat, provided on a side of another one of the two chambers, and on which a fourth damping valve which opens after the third damping valve opens is placed,
the first piston body and the second piston body are connected so that the first passage communicates with the third passage and the second passage communicates with the fourth passage,
an inner diameter of the first piston body and an inner diameter of the second piston body are different, and
one of the first piston body and the second piston body having a smaller inner diameter is in contact with and attached to the piston rod.

2. The shock absorber according to claim 1, wherein a check valve which opens for a flow toward the one of the two chambers or the another one of the two chambers and closes for a flow in an opposite direction is provided in the first damping valve or the third damping valve.

3. A manufacturing method of a shock absorber which is a manufacturing method of a shock absorber including:
a cylinder in which a working fluid is sealed;
a piston fitted in the cylinder to be slidable and partitioning an inside of the cylinder into two chambers; and
a piston rod connected to the piston and extending to an outside of the cylinder, wherein
the piston includes:
a first piston body having
   a first passage and a second passage configured to allow the working fluid to flow between the two chambers in the cylinder due to movement of the piston,
   a first seat communicating with the first passage and on which a first damping valve which opens at a low piston speed is placed, and
   a second seat having a larger diameter than the first seat, provided on a side of one of the two chambers, and on which a second damping valve which opens after the first damping valve opens is placed;
a second piston body having
   a third passage and a fourth passage configured to allow the working fluid to flow between the two chambers in the cylinder due to movement of the piston,
   a third seat communicating with the fourth passage and on which a third damping valve which opens at a low piston speed is placed, and
   a fourth seat having a larger diameter than the third seat, provided on a side of another one of the two chambers, and on which a fourth damping valve which opens after the third damping valve opens is placed; and
a piston band provided in the first piston body and the second piston body,
the manufacturing method comprising:
a first step of connecting one surface of the first piston body and one surface of the second piston body so that the first passage communicates with the third passage and the second passage communicates with the fourth passage;
a second step of processing an end portion of the first passage opposite to the third passage, an end portion of the third passage opposite to the first passage, an end portion of the second passage opposite to the fourth passage, an end portion of the fourth passage opposite to the second passage, and a groove to which the piston band is attached; and
a third step of attaching the piston band to the groove.

4. The manufacturing method of a shock absorber according to claim 3, wherein the groove includes:
a plurality of shallow groove parts; and
a deep groove part provided on the second seat side with respect to the plurality of shallow groove parts and having a depth larger than that of the plurality of shallow groove parts, and
the third step is configured to attach the piston band to the deep groove part via the second seat and then attach the piston band to the plurality of shallow groove parts.

* * * * *